United States Patent
Matsumoto

(10) Patent No.: US 10,465,141 B2
(45) Date of Patent: Nov. 5, 2019

(54) LUBRICANT COMPOSITION FOR REFRIGERATING MACHINES, AND REFRIGERATING MACHINE

(71) Applicant: IDEMITSU KOSAN CO., LTD., Chiyoda-ku (JP)

(72) Inventor: Tomoya Matsumoto, Funabashi (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/525,387

(22) PCT Filed: Oct. 23, 2015

(86) PCT No.: PCT/JP2015/080025
§ 371 (c)(1),
(2) Date: May 9, 2017

(87) PCT Pub. No.: WO2016/080149
PCT Pub. Date: May 26, 2016

(65) Prior Publication Data
US 2017/0335230 A1 Nov. 23, 2017

(30) Foreign Application Priority Data
Nov. 19, 2014 (JP) .................................. 2014-235061

(51) Int. Cl.
| | | |
|---|---|---|
| *C10M 169/04* | (2006.01) | |
| *C09K 5/04* | (2006.01) | |
| *C10M 107/24* | (2006.01) | |
| *C10M 107/34* | (2006.01) | |
| *C10M 127/02* | (2006.01) | |
| *F25B 1/00* | (2006.01) | |
| *C10M 105/38* | (2006.01) | |
| *C10M 171/00* | (2006.01) | |

(52) U.S. Cl.
CPC ............. *C10M 169/04* (2013.01); *C09K 5/04* (2013.01); *C09K 5/044* (2013.01); *C09K 5/045* (2013.01); *C10M 105/38* (2013.01); *C10M 107/24* (2013.01); *C10M 107/34* (2013.01); *C10M 127/02* (2013.01); *C10M 171/008* (2013.01); *F25B 1/00* (2013.01); *C09K 2205/126* (2013.01); *C10M 2203/04* (2013.01); *C10M 2203/06* (2013.01); *C10M 2207/026* (2013.01); *C10M 2207/042* (2013.01); *C10M 2207/2835* (2013.01); *C10M 2209/043* (2013.01); *C10M 2209/1033* (2013.01); *C10M 2209/1055* (2013.01); *C10M 2223/041* (2013.01); *C10N 2220/022* (2013.01); *C10N 2220/302* (2013.01); *C10N 2230/08* (2013.01); *C10N 2230/10* (2013.01); *C10N 2240/30* (2013.01)

(58) Field of Classification Search
CPC .............. C10M 169/04; C10M 105/38; C10M 171/008; C10M 127/02; C10M 107/34; C10M 107/24; C10M 2223/041; C10M 2209/1033; C10M 2207/042; C10M 2207/026; C10M 2203/06; C10M 2209/043; C10M 2209/1055; C10M 2203/04; C10M 2207/2835; C09K 2205/126; C09K 5/045; C09K 5/044; C09K 5/04; F25B 1/00; C10N 2240/30; C10N 2230/10; C10N 2230/08; C10N 2220/302; C10N 2220/022
USPC ........................................................ 252/68
See application file for complete search history.

(56) References Cited

U.S. PATENT DOCUMENTS

| | | | |
|---|---|---|---|
| 10,022,576 B2 * | 7/2018 | Elsheikh ................ C07C 17/389 |
| 2010/0025619 A1 | 2/2010 | Riva et al. | |
| 2010/0288965 A1 | 11/2010 | Howell et al. | |
| 2012/0085110 A1 | 4/2012 | Howell et al. | |
| 2013/0012419 A1 | 1/2013 | Matsumoto | |
| 2013/0274163 A1 | 10/2013 | Matsumoto | |
| 2014/0128302 A1 * | 5/2014 | Matsumoto ............ C09K 5/045 508/465 |
| 2014/0135241 A1 * | 5/2014 | Matsumoto ............ C09K 5/045 508/304 |
| 2014/0314606 A1 | 10/2014 | Maeyama et al. | |
| 2014/0314607 A1 | 10/2014 | Maeyama et al. | |

FOREIGN PATENT DOCUMENTS

| | | | |
|---|---|---|---|
| CN | 101868522 A | 10/2010 | |
| CN | 102791838 A | 11/2012 | |
| CN | 103108944 A | 5/2013 | |
| CN | 104110375 A * | 10/2014 | .......... F04C 18/3564 |

(Continued)

OTHER PUBLICATIONS

Extended European Search Report dated Jul. 4, 2018 in Patent Application No. 15860971.9.

(Continued)

*Primary Examiner* — Douglas J Mc Ginty
(74) *Attorney, Agent, or Firm* — Oblon, McClelland, Maier & Neustadt, L.L.P.

(57) ABSTRACT

The lubricating oil composition for a refrigerator of the present invention is a lubricating oil composition for a refrigerator that is used in combination with a refrigerant containing at least one fluorine-containing organic compound selected from compounds represented by the following molecular formula (A):

$$C_p F_r R_s \qquad (A)$$

wherein R represents Cl, Br, I, or H; p represents an integer of from 2 to 6; r represents an integer of from 1 to 12; and s represents an integer of from 0 to 11, provided that the molecule contains at least one carbon-carbon unsaturated bond, and the lubricating oil composition for a refrigerator contains a base oil and a cyclic organic compound having a cyclic hydrocarbon structure and having one or more non-conjugated double bond in a cyclic structure or a side chain thereof.

11 Claims, No Drawings

(56) References Cited

FOREIGN PATENT DOCUMENTS

| JP | 2009-518460 | A | 5/2009 |
|---|---|---|---|
| JP | 2014-211092 | A | 11/2014 |
| JP | 2014-211093 | A | 11/2014 |
| JP | 2015-214928 | A | 12/2015 |
| JP | 2015-214929 | A | 12/2015 |
| JP | 2015-214930 | A | 12/2015 |
| JP | 2015-215129 | A | 12/2015 |
| JP | 2015-215130 | A | 12/2015 |
| WO | 2009/066722 | A1 | 5/2009 |
| WO | 2011/118732 | A1 | 9/2011 |
| WO | 2012/043617 | A1 | 4/2012 |
| WO | WO 2014/069603 | A1 | 5/2014 |
| WO | 2014/203355 | A1 | 12/2014 |
| WO | 2015/174032 | A1 | 11/2015 |
| WO | 2015/174033 | A1 | 11/2015 |

OTHER PUBLICATIONS

International Search Report dated Jan. 12, 2016 in PCT/JP2015/080025 filed Oct. 23, 2015.
Offion Action dated Sep. 18, 2018 in Japanese Patent Application No. 2814-235061 (with unedited computer generated English translation), 11 pages.
Office Action dated Jan. 8, 2018 in corresponding Japanese Patent Application No. 2014-235061 (with English Translation), 6 pages.
Office Action dated Apr. 29, 2019 in European Patent Application No. 15 860 971.9.
Decision of Refusal dated Jul. 9, 2019, in Japanese Patent Application No. 2014-235061 (with English translation).
Office Action dated Aug. 9, 2019, in Chinese Patent Application No. 201580062086.3 (with English translation).

* cited by examiner

LUBRICANT COMPOSITION FOR REFRIGERATING MACHINES, AND REFRIGERATING MACHINE

TECHNICAL FIELD

The present invention relates to a lubricating oil composition for a refrigerator that is capable of being preferably used in a refrigerator having charged therein a refrigerant containing an unsaturated refrigerant, such as an unsaturated hydrofluorocarbon, and a refrigerator having used therein the lubricating oil composition for a refrigerator.

In general, a refrigerator is constituted by at least a compressor, a condenser, an expansion mechanism (such as an expansion valve), and an evaporator, or further constituted by dryer, and has such a structure that a mixed liquid of a refrigerant and a lubricating oil (i.e., a refrigerator oil) is circulated in the closed system. As the refrigerant for a refrigerator, a chlorine-containing compound, such as a chlorofluorocarbon, has been widely used, but due to the environmental pollution, such as the ozone layer destruction, a hydrofluorocarbon (HFC) containing no chlorine and a natural refrigerant, such as carbon dioxide, are being used instead.

As the HFC refrigerant, for example, a saturated hydrofluorocarbon (which may be hereinafter referred to as a saturated HFC) represented by 1,1,1,2-tetrafluoroethane (R134a), difluoromethane (R32), pentafluoroethane (R125), and 1,1,1-trifluoroethane (R143a), has been subjected to practical use. Furthermore, for example, the use of a hydrofluoroolefin (which may be hereinafter referred to as an HFO), which is an unsaturated hydrofluorocarbon, such as 1,3,3,3-tetrafluoropropene (HFO1234ze) and 2,3,3,3-tetrafluoropropene (HFO1234yf), is being also considered.

On the other hand, various additives have been added to the refrigerator oil, which is used in combination with the refrigerant including a saturated HFC, a natural refrigerant, and HFO. For example, PTL 1 describes the use of a compound having a conjugated double bond, such as an α-olefin and farnesene, as an additive, for enhancing the stability of the refrigerator oil used in combination with the refrigerant.

CITATION LIST

Patent Literatures

PTL 1: WO 2009/066722

SUMMARY OF INVENTION

Technical Problem

In recent years, reduction of environmental load is demanded for a refrigerant, and a refrigerant that contains a large proportion of HFO having a small global warming potential is being demanded. The refrigerant that contains a large proportion of HFO has low thermal stability due to the unsaturated bond of HFO, and thus the refrigerant oil is also demanded to have high thermal stability.

The use of the refrigerant that contains a large proportion of HFO induces the formation of sludge in the refrigerator oil due to deterioration thereof caused by the unsaturated bond of HFO and oxygen presents in a slight amount in the refrigerator oil. The formation of sludge may cause, for example, clogging of a capillary tube used as an expansion valve, in some cases.

However, the ordinary refrigerator oil may be insufficient in the thermal stability and the effect of suppressing the formation of sludge. Accordingly, development of such a refrigerator oil has been demanded that improves the thermal stability and sufficiently suppresses the formation of sludge, in the use thereof in combination with the refrigerant that contains a large proportion of HFO.

The present invention has been made in view of the aforementioned problem, and an object thereof is to provide a lubricating oil composition for a refrigerator that is excellent in thermal stability and is capable of suppressing the formation of sludge, even in the use thereof in combination with a refrigerant that contains an unsaturated refrigerant, such as HFO.

Solution to Problem

As a result of earnest investigations made by the present inventors, it has been found that the problem can be solved by adding a particular cyclic organic compound to a lubricating oil composition for a refrigerator used in combination with a refrigerant that contains an unsaturated refrigerant, such as HFO, and thus the following invention has been completed.

[1] A lubricating oil composition for a refrigerator, which is used in combination with a refrigerant containing at least one fluorine-containing organic compound selected from compounds represented by the following molecular formula (A):

$$C_p F_r R_s \qquad (A)$$

wherein R represents Cl, Br, I, or H; p represents an integer of from 2 to 6; r represents an integer of from 1 to 12; and s represents an integer of from 0 to 11, provided that the molecule contains at least one carbon-carbon unsaturated bond, the lubricating oil composition containing a base oil and a cyclic organic compound having a cyclic hydrocarbon structure and having one or more non-conjugated double bond in a cyclic structure or a side chain thereof.

[2] A refrigerator containing, charged therein, a refrigerant containing at least one fluorine-containing organic compound selected from compounds represented by the following molecular formula (A):

$$C_p F_r R_s \qquad (A)$$

wherein R represents Cl, Br, I, or H; p represents an integer of from 2 to 6; r represents an integer of from 1 to 12; and s represents an integer of from 0 to 11, provided that the molecule contains at least one carbon-carbon unsaturated bond, and a lubricating oil composition for a refrigerator containing a base oil and a cyclic organic compound having a cyclic hydrocarbon structure and having one or more non-conjugated double bond in a cyclic structure or a side chain thereof.

[3] A method for producing a lubricating oil composition for a refrigerator, which is used in combination with a refrigerant containing at least one fluorine-containing organic compound selected from compounds represented by the following molecular formula (A):

$$C_p F_r R_s \qquad (A)$$

wherein R represents Cl, Br, I, or H; p represents an integer of from 2 to 6; r represents an integer of from 1 to 12; and s represents an integer of from 0 to 11, provided that the molecule contains at least one carbon-carbon unsaturated bond, the method including blending a cyclic organic compound having a cyclic hydrocarbon structure and having one or more non-conjugated double bond in a cyclic structure or a side chain thereof, with a base oil.

Advantageous Effects of Invention

According to the present invention, a lubricating oil composition for a refrigerator that is used in combination with a refrigerant that contains an unsaturated refrigerant, such as HFO can be excellent in thermal stability and can suppress the formation of sludge.

DESCRIPTION OF EMBODIMENTS

The present invention will be described with reference to embodiments below.

The lubricating oil composition for a refrigerator according to one embodiment of the present invention contains a base oil, and a prescribed cyclic organic compound added to the base oil. The components will be described in more detail below.

[Cyclic Organic Compound]

The cyclic organic compound has a cyclic hydrocarbon structure and has one or more non-conjugated double bond in a cyclic structure or a side chain thereof.

The cyclic organic compound is capable of removing oxygen presents in a slight amount in the refrigerator, particularly in the lubricating oil composition for a refrigerator, through reaction with the non-conjugated double bond. Accordingly, the thermal stability of the lubricating oil composition for a refrigerator can be enhanced. Furthermore, the deterioration of the base oil caused by the unsaturated bond of the refrigerant and oxygen present in a slight amount in the lubricating oil composition for a refrigerator can be prevented to suppress the formation of sludge.

The non-conjugated double bond contained in the cyclic organic compound is a carbon-carbon double bond, and the number thereof is one or more, and preferably one or two. The cyclic organic compound preferably does not have a conjugated double bond. The cyclic organic compound is preferably a hydrocarbon having 3 to 20 carbon atoms, and more preferably a hydrocarbon having 6 to 10 carbon atoms.

Specific examples of the cyclic organic compound used in the present embodiment include cyclohexene, 1-methylcyclohexene, vinylcyclohexane, 4-vinylcyclohexene, limonene, α-pinene, β-pinene, and γ-terpinene. Among these, limonene, α-pinene, β-pinene, and γ-terpinene are preferred, and β-pinene and γ-terpinene are more preferred, since they have high thermal stability, and can decrease the formation of sludge.

The cyclic organic compound is preferably contained in an amount of 0.1 to 10 mass % based on the total amount of the lubricating oil composition for a refrigerator. When the content is in the range, the thermal stability of the lubricating oil composition for a refrigerator can be enhanced, and the formation of sludge can be suppressed, while making good the compatibility between the lubricating oil composition for a refrigerator and the refrigerant, without impairing the lubricating performance. In this point of view, the amount of the cyclic organic compound is more preferably 0.3 to 8 mass %, and further preferably 0.3 to 5 mass %, based on the total amount of the lubricating oil composition for a refrigerator. In the case where β-pinene is used, in particular, the amount thereof is preferably 0.3 to 1.5 mass % based on the total amount of the lubricating oil composition for a refrigerator.

[Base Oil]

In the lubricating oil composition for a refrigerator in the present embodiment, the base oil used may be generally an oxygen-containing organic compound selected from a polyvinyl ether compound (PVE), a polyoxyalkylene glycol compound (PAG), a copolymer having a structure of a poly(oxy)alkylene glycol or a monoether thereof and a polyvinyl ether (ethylene copolymer: ECP), and a polyol ester compound (POE). The use of the base oil may enhance the lubricating performance of the lubricating oil composition for a refrigerator.

In the present embodiment, PVE, PAG, and ECP are preferred, and among these, PVE and PAG are more preferred, since high thermal stability may be obtained by using in combination with the aforementioned cyclic organic compound.

The base oil is generally contained in an amount of 75 to 99.9 mass %, preferably 80 to 99.9 mass %, and more preferably 90 to 99.7 mass %, based on the total amount of the lubricating oil composition for a refrigerator.

<Polyvinyl Ether Compound (PVE)>

The polyvinyl ether compound (PVE) is a polymer having a vinyl ether-derived constituent unit, and specifically, examples thereof include a polyvinyl compound having a constituent unit represented by the following general formula (A-1).

(A-1)

In the general formula (A-1), $R^{1a}$, $R^{2a}$, and $R^{3a}$ each independently represent a hydrogen atom or a hydrocarbon group having 1 to 8 carbon atoms, and they may be the same as or different from each other. Here, specifically, examples of the hydrocarbon group include an alkyl group, such as a methyl group, an ethyl group, an n-propyl group, an isopropyl group, an n-butyl group, an isobutyl group, a sec-butyl group, a tert-butyl group, a pentyl group of every kind, a hexyl group of every kind, a heptyl group of every kind, an octyl group of every kind, etc.; a cycloalkyl group, such as a cyclopentyl group, a cyclohexyl group, a methylcyclohexyl group of every kind, an ethylcyclohexyl group of every kind, a dimethylcyclohexyl group of every kind, etc.; an aryl group, such as a phenyl group, a methylphenyl group of every kind, an ethylphenyl group of every kind, a dimethylphenyl group of every kind, etc.; and an arylalkyl group, such as a benzyl group, a phenylethyl group of every kind, a methylbenzyl group of every kind, etc. Of those, an alkyl group is preferred. In addition, $R^{1a}$, $R^{2a}$, and $R^{3a}$ are each more preferably a hydrogen atom or an alkyl group having 3 or less carbon atoms.

$R^{4a}$ represents a divalent hydrocarbon group having 2 to 10 carbon atoms. Here, specifically, examples of the divalent hydrocarbon group having 2 to 10 carbon atoms include a divalent aliphatic hydrocarbon group, such as an ethylene group, a phenylethylene group, a 1,2-propylene group, a 2-phenyl-1,2-propylene group, a 1,3-propylene group, a butylene group of every kind, a pentylene group of every kind, a hexylene group of every kind, a heptylene group of every kind, an octylene group of every kind, a nonylene group of every kind, a decylene group of every kind, etc.; an alicyclic hydrocarbon group having two bonding sites in an alicyclic hydrocarbon such as cyclohexane, methylcyclohexane, ethylcyclohexane, dimethylcyclohexane, propylcyclohexane, etc.; a divalent aromatic hydrocarbon group, such as a phenylene group of every kind, a methylphenylene group of every kind, an ethylphenylene group of every kind, a dimethylphenylene group of every kind, a naphthylene group of every kind, etc.; an alkyl aromatic hydrocarbon group having a monovalent bonding site in each of an alkyl group moiety and an aromatic moiety of an alkyl aromatic hydrocarbon such as toluene, ethylbenzene, etc.; an alkyl aromatic hydrocarbon group having bonding sites in an alkyl group moiety of a polyalkyl aromatic hydrocarbon, such as xylene, diethylbenzene, etc.; and the like. Of those, the aliphatic hydrocarbon group having 2 to 4 carbon atoms is more preferred. Plural $R^{4a}$Os may be the same as or different from each other. In the general formula (A-1), r represents a repeating number, and an average value thereof is a number ranging from 0 to 10, and preferably from 0 to 5.

Furthermore, in the general formula (A-1), $R^{5a}$ represents a hydrocarbon group having 1 to 10 carbon atoms. Specifically, this hydrocarbon group represents an alkyl group, such as a methyl group, an ethyl group, an n-propyl group, an isopropyl group, an n-butyl group, an isobutyl group, a sec-butyl group, a tert-butyl group, a pentyl group of every kind, a hexyl group of every kind, a heptyl group of every kind, an octyl group of every kind, a nonyl group of every kind, a decyl group of every kind, etc.; a cycloalkyl group, such as a cyclopentyl group, a cyclohexyl group, a methylcyclohexyl group of every kind, an ethylcyclohexyl group of every kind, a propylcyclohexyl group of every kind, a dimethylcyclohexyl group of every kind, etc.; an aryl group, such as a phenyl group, a methylphenyl group of every kind, an ethylphenyl group of every kind, a dimethylphenyl group of every kind, a propylphenyl group of every kind, a trimethylphenyl group of every kind, a butylphenyl group of every kind, a naphthyl group of every kind, etc.; or an arylalkyl group, such as a benzyl group, a phenylethyl group of every kind, a methylbenzyl group of every kind, a phenylpropyl group of every kind, a phenylbutyl group of every kind, etc. Of those, a hydrocarbon group having 1 to 8 carbon atoms is preferred, and an alkyl group having 1 to 6 carbon atoms is more preferred. The alkyl groups may be any of straight-chain, branched, and cyclic groups.

In the polyvinyl compound having the constituent unit represented by the general formula (A-1), a polymer or a copolymer containing 50 to 100 mass % of a constituent unit in which $R^{1a}$, $R^{2a}$, and $R^{3a}$ are all hydrogen atoms, r is 0, and $R^{5a}$ is an ethyl group, and containing 0 to 50 mass % of a constituent unit in which $R^{1a}$, $R^{2a}$, and $R^{3a}$ are all hydrogen atoms, r is 0, and $R^{5a}$ is an alkyl group having 3 or 4 carbon atoms is preferred.

It is more preferred that the proportion of the constituent unit in which $R^{5a}$ is an ethyl group is 70 to 100 mass %, and the proportion of the constituent unit in which $R^{5a}$ is an alkyl group having 3 or 4 carbon atoms is 0 to 30 mass %.

The alkyl group having 3 or 4 carbon atoms in $R^{5a}$ used may be a n-propyl group, an isopropyl group, a n-butyl group, an isobutyl group, a sec-butyl group, or a tert-butyl group, and an isobutyl group is particularly preferred.

Although the polyvinyl ether compound is one having the constituent unit represented by the general formula (A-1), a repeating number thereof may be properly chosen according to a desired kinematic viscosity described later. The aforementioned polyvinyl ether compound can be produced through polymerization of a corresponding vinyl ethereal monomer. The vinyl ethereal monomer that can be used herein is one represented by the following general formula (A-2).

(A-2)

In the formula, $R^{1a}$, $R^{2a}$, $R^{3a}$, $R^{4a}$, $R^{5a}$, and r are the same as those mentioned above.

As this vinyl ethereal monomer, there are various monomers corresponding to the aforementioned polyvinyl ether compounds. Examples thereof include vinyl methyl ether, vinyl ethyl ether, vinyl-n-propyl ether, vinyl isopropyl ether, vinyl-n-butyl ether, vinyl isobutyl ether, vinyl-sec-butyl ether, vinyl-tert-butyl ether, vinyl-n-pentyl ether, vinyl-n-hexyl ether, vinyl-2-methoxyethyl ether, vinyl-2-ethoxyethyl ether, vinyl-2-methoxy-1-methylethyl ether, vinyl-2-methoxypropyl ether, vinyl-3,6-dioxaheptyl ether, vinyl-3,6,9-trioxadecyl ether, vinyl-1,4-dimethyl-3,6-dioxaheptyl ether, vinyl-1,4,7-trimethyl-3,6,9-trioxadecyl ether, vinyl-2,6-dioxa-4-heptyl ether, vinyl-2,6,9-trioxa-4-decyl ether, 1-methoxypropene, 1-ethoxypropene, 1-n-propoxypropene, 1-isopropoxypropene, 1-n-butoxypropene, 1-isobutoxypropane, 1-sec-butoxypropene, 1-tert-butoxypropene, 2-methoxypropene, 2-ethoxypropene, 2-n-propoxypropene, 2-isopropoxypropene, 2-n-butoxypropene, 2-isobutoxypropene, 2-sec-butoxypropene, 2-tert-butoxypropene, 1-methoxy-1-butene, 1-ethoxy-1-butene, 1-n-propoxy-1-butene, 1-isopropoxy-1-butene, 1-n-butoxy-1-butene, 1-isobutoxy-1-butene, 1-sec-butoxy-1-butene, 1-tert-butoxy-1-butene, 2-methoxy-1-butene, 2-ethoxy-1-butene, 2-n-propoxy-1-butene, 2-isopropoxy-1-butene, 2-n-butoxy-1-butene, 2-isobutoxy-1-butene, 2-sec-butoxy-1-butene, 2-tert-butoxy-1-butene, 2-methoxy-2-butene, 2-ethoxy-2-butene, 2-n-propoxy-2-butene, 2-isopropoxy-2-butene, 2-n-butoxy-2-butene, 2-isobutoxy-2-butene, 2-sec-butoxy-2-butene, 2-tert-butoxy-2-butene, and the like. These vinyl ethereal monomers can be produced by a known method.

In an end moiety of the polymer represented by the general formula (A-1), a monovalent group derived from a saturated hydrocarbon, an ether, an alcohol, a ketone, an amide, a nitrile, or the like may be introduced by a known method.

Above all, as the polyvinyl ether compound, those having an end structure of each of the following (1) to (4) are suitable.

(1) A compound in which one end thereof is represented by the following general formula (A-1-i), and the remaining end is represented by the following general formula (A-1-ii).

(A-1-i)

In the formula, $R^{6a}$, $R^{7a}$, and $R^{8a}$ each independently represent a hydrogen atom or a hydrocarbon group having 1 to 8 carbon atoms, and they may be the same as or different from each other; $R^{9a}$ represents a divalent hydrocarbon group having 2 to 10 carbon atoms; $R^{10a}$ represents a hydrocarbon group having 1 to 10 carbon atoms; r1 represents a number of 0 to 10 in terms of an average value thereof; and in the case where plural $R^{9a}$Os are present, the plural $R^{9a}$Os may be the same as or different from each other.

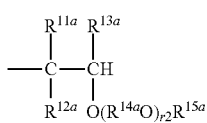

(A-1-ii)

In the formula, $R^{11a}$, $R^{12a}$, and $R^{13a}$ each independently represent a hydrogen atom or a hydrocarbon group having 1 to 8 carbon atoms, and they may be the same as or different from each other; $R^{14a}$ represents a divalent hydrocarbon group having 2 to 10 carbon atoms; $R^{15a}$ represents a hydrocarbon group having 1 to 10 carbon atoms; r2 represents a number of 0 to 10 in terms of an average value thereof; and in the case where plural $R^{14a}$Os are present, the plural $R^{14a}$Os may be the same as or different from each other.

(2) A compound in which one end thereof is represented by the foregoing general formula (A-1-i), and the remaining end is represented by the following general formula (A-1-iii):

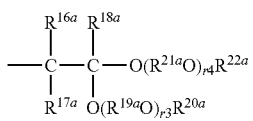

(A-1-iii)

In the formula, $R^{16a}$, $R^{17a}$, and $R^{18a}$ each independently represent a hydrogen atom or a hydrocarbon group having 1 to 8 carbon atoms, and they may be the same as or different from each other; $R^{19a}$ and $R^{21a}$ each independently represent a divalent hydrocarbon group having 2 to 10 carbon atoms, and they may be the same as or different from each other; $R^{20a}$ and $R^{22a}$ each independently represent a hydrocarbon group having 1 to 10 carbon atoms, and they may be the same as or different from each other; r3 and r4 each represent a number of 0 to 10 in terms of an average value thereof, they may be the same as or different from each other; in the case where plural $R^{19a}$Os are present, the plural $R^{19a}$Os may be the same as or different from each other; and in the case where plural $R^{21a}$Os are present, the plural $R^{21a}$Os may be the same as or different from each other.

(3) A compound in which one end thereof is represented by the foregoing general formula (A-1-i), and the remaining end has an olefinic unsaturated bond:

(4) A compound in which one end thereof is represented by the foregoing general formula (A-1-i), and the remaining end is represented by the following general formula (A-1-iv):

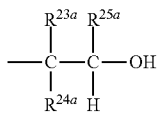

(A-1-iv)

In the formula, $R^{23a}$, $R^{24a}$, and $R^{25a}$ each represent a hydrogen atom or a hydrocarbon group having 1 to 8 carbon atoms, and they may be the same as or different from each other.

The polyvinyl ether compound may also be a mixture of two or more selected from those having an end structure of each of the foregoing (1) to (4). Suitable examples of such a mixture may include a mixture of the compound having the end structure of the foregoing (1) and the compound having the end structure of the foregoing (4); and a mixture of the compound having the end structure of the foregoing (2) and the compound having the end structure of the foregoing (3).

As for the polyvinyl ether compound, it is preferred to choose a degree of polymerization, an end structure, and so on so as to have a desired viscosity range as mentioned later. The polyvinyl ether compound may be used solely, or it may be used in combination of two or more thereof.

In the polyvinyl compound having the constituent unit represented by the general formula (A-1), a compound in which one end thereof is presented by the general formula (A-1-i), and the remaining end is represented by the general formula (A-1-ii) is preferred.

Above all, it is more preferred that in the formulae (A-1-i) and (A-1-ii), all of $R^{6a}$, $R^{7a}$, $R^{8a}$, $R^{11a}$, $R^{12a}$, and $R^{13a}$ are a hydrogen atom, all of r1 and r2 are 0, and $R^{10a}$ and $R^{15a}$ are each an alkyl group having 1 to 4 carbon atoms.

<Polyoxyalkylene Glycol Compound (PAG)>

Examples of the polyoxyalkylene glycol compound (PAG) include a compound represented by the following general formula (B-1). In the case where PAG is contained in the base oil, the PAG may be used either solely or in combination of two or more kinds thereof.

$$R^{1b}[-(OR^{2b})_m-OR^{3b}]_n \quad (B-1)$$

In the formula, $R^{1b}$ represents a hydrogen atom, a monovalent hydrocarbon group having 1 to 10 carbon atoms, an acyl group having 2 to 10 carbon atoms, a hydrocarbon group having 2 to 6 bonding sites and having 1 to 10 carbon atoms, or an oxygen-containing hydrocarbon group having 1 to 10 carbon atoms; $R^{2b}$ represents an alkylene group having 2 to 4 carbon atoms; $R^{3b}$ represents a hydrogen atom, a hydrocarbon group having 1 to 10 carbon atoms, an acyl group having 2 to 10 carbon atoms, or an oxygen-containing hydrocarbon group having 1 to 10 carbon atoms; n represents an integer of 1 to 6; and m represents a number of 6 to 80 in terms of an average value of (m×n).

In the general formula (B-1), the monovalent hydrocarbon group having 1 to 10 carbon atoms in each of $R^{1b}$ and $R^{3b}$ may be any of straight-chain, branched, and cyclic groups. The hydrocarbon group is preferably an alkyl group, and specific examples thereof may include a methyl group, an ethyl group, an n-propyl group, an isopropyl group, a butyl group of every kind, a pentyl group of every kind, a hexyl group of every kind, a heptyl group of every kind, an octyl group of every kind, a nonyl group of every kind, a decyl group of every kind, a cyclopentyl group, a cyclohexyl group, and the like. As for the aforementioned monovalent hydrocarbon group, when the number of carbon atoms is 10 or less, the compatibility with the refrigerant becomes good. From such a viewpoint, the number of carbon atoms of the monovalent hydrocarbon group is more preferably 1 to 4.

The hydrocarbon group moiety which the acyl group having 2 to 10 carbon atoms in each of $R^{1b}$ and $R^{3b}$ has may be any of straight-chain, branched, and cyclic groups. The hydrocarbon group moiety of the acyl group is preferably an alkyl group, and specific examples thereof include those having 1 to 9 carbon atoms among the alkyl groups which may be chosen as the aforementioned $R^{1b}$ and $R^{3b}$. When the number of carbon atoms of the acyl group is 10 or less, the compatibility with the refrigerant becomes good. The number of carbon atoms of the acyl group is preferably 2 to 4.

In the case where all of $R^{1b}$ and $R^{3b}$ are a hydrocarbon group or an acyl group, $R^{1b}$ and $R^{3b}$ may be the same as or different from each other.

In the case where $R^{1b}$ is the hydrocarbon group having 2 to 6 bonding sites and having 1 to 10 carbon atoms, this hydrocarbon group may be either linear or cyclic. The hydrocarbon group having 2 bonding sites is preferably an aliphatic hydrocarbon group, and examples thereof include an ethylene group, a propylene group, a butylene group, a pentylene group, a hexylene group, a heptylene group, an octylene group, a nonylene group, a decylene group, a cyclopentylene group, a cyclohexylene group, and the like. Examples of the other hydrocarbon groups may include residues resulting from removing a hydroxyl group from a bisphenol compound such as bisphenol, bisphenol F, bisphenol A, etc. The hydrocarbon group having 3 to 6 bonding sites is preferably an aliphatic hydrocarbon group, and examples thereof may include residues resulting from removing a hydroxyl group from a polyhydric alcohol, such as trimethylolpropane, glycerin, pentaerythritol, sorbitol, 1,2,3-trihydroxycyclohexane, 1,3,5-trihydroxycyclohexane, etc.

When the number of carbon atoms of this aliphatic hydrocarbon group is 10 or less, the compatibility with the refrigerant becomes good. The number of carbon atoms of this aliphatic hydrocarbon group is preferably 2 to 6.

Furthermore, examples of the oxygen-containing hydrocarbon group having 1 to 10 carbon atoms in each of $R^{1b}$ and $R^{3b}$ may include an ether bond-containing linear or cyclic aliphatic group (for example, a tetrahydrofurfuryl group), and the like.

At least one of $R^{1b}$ and $R^{3b}$ is preferably an alkyl group, especially an alkyl group having 1 to 4 carbon atoms.

$R^{2b}$ in the general formula (B-1) is an alkylene group having 2 to 4 carbon atoms, and examples of the oxyalkylene group as a repeating unit include an oxyethylene group, an oxypropylene group, and an oxybutylene group. The oxyalkylene groups in one molecule may be the same as each other, and two or more kinds of oxyalkylene groups may also be contained. It is preferred that at least an oxypropylene unit is contained in one molecule, and it is more preferred that 50 mol % or more of an oxypropylene unit is contained in the oxyalkylene unit, and it is more preferred that 70 mol % or more of an oxypropylene unit is contained therein.

In the general formula (B-1), n is an integer of 1 to 6 and is determined according to the number of bonding sites of $R^{1b}$. For example, in the case where $R^{1b}$ is an alkyl group or an acyl group, then n is 1; and in the case where $R^{1b}$ is an aliphatic hydrocarbon group having 2, 3, 4, 5, or 6 bonding sites, then n is 2, 3, 4, 5, or 6, respectively.

m is a number providing an average value of (m×n) of 6 to 80. When the average value is 80 or less, the compatibility with a refrigerant may be improved. The average value of m×n is preferably determined in such a manner that the viscosity of the base oil is in the desired range.

n is preferably an integer of 1 to 3, and more preferably 1. In the case where n is 1, it is preferred that any one of $R^{1b}$ and $R^{3b}$ represents an alkyl group, and it is more preferred that both of them each represent an alkyl group. Similarly, in the case where n is 2 or more, it is preferred that any one of plural $R^{3b}$s in one molecule represents an alkyl group, and it is more preferred that all of them each represent an alkyl group.

In the case where n is 2 or more, plural $R^{3b}$s in one molecule may be the same as or different from each other.

The polyoxyalkylene glycol compound represented by the general formula (B-1) encompasses a polyoxyalkylene glycol having a hydroxyl group at the end thereof, which may be preferably used even though a hydroxyl group is contained when the content of the hydroxyl group is 50 mol % or less based on the whole end groups.

<Copolymer Having Structure of Poly(Oxy)Alkylene Glycol or Monoether Thereof and Polyvinyl Ether>

In the lubricating oil composition for a refrigerator according to the present embodiment, examples of the copolymer having a structure of a poly(oxy)alkylene glycol or a monoether thereof and polyvinyl ether that can be used as the base oil include a copolymer represented by the following general formula (C-1) and a copolymer represented by the following general formula (C-2) (hereinafter referred to as "polyvinyl ether copolymer I" and "polyvinyl ether copolymer II", respectively). The poly(oxy)alkylene glycol refers to both a polyalkylene glycol and a polyoxyalkylene glycol.

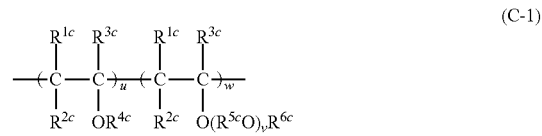

(C-1)

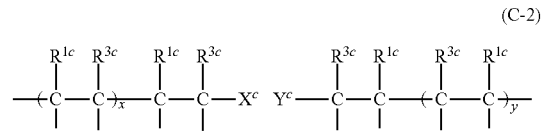

(C-2)

In the general formula (C-1), $R^{1c}$, $R^{2c}$, and $R^{3c}$ each independently represent a hydrogen atom or a hydrocarbon group having 1 to 8 carbon atoms, and they may be the same as or different from each other; $R^{5c}$ represents a divalent hydrocarbon group having 2 to 4 carbon atoms; $R^{6c}$ represents an aliphatic or alicyclic hydrocarbon group having 1 to 20 carbon atoms, an aromatic hydrocarbon group having 1 to 20 carbon atoms which may have a substituent, an acyl group having 2 to 20 carbon atoms, or an oxygen-containing hydrocarbon group having 2 to 50 carbon atoms; $R^{4c}$ represents a hydrocarbon group having 1 to 10 carbon atoms; and in the case where a plurality of each of $R^{1c}$ to $R^{6c}$ are present, they may be each the same as or different from each other.

Here, specifically, the hydrocarbon group having 1 to 8 carbon atoms in $R^{1c}$ to $R^{3c}$ represents an alkyl group, such as a methyl group, an ethyl group, an n-propyl group, an isopropyl group, an n-butyl group, an isobutyl group, a sec-butyl group, a tert-butyl group, a pentyl group of every kind, a hexyl group of every kind, a heptyl group of every kind, an octyl group of every kind, etc.; a cyclopentyl group, a cyclohexyl group, a methylcyclohexyl group of every kind, an ethylcyclohexyl group of every kind, a dimethylcyclohexyl group of every kind, an aryl group such as a dimethylphenyl group of every kind, etc.; or an arylalkyl group, such as a benzyl group, a phenylethyl group of every kind, a methylbenzyl group of every kind, etc. In particular, $R^{1c}$, $R^{2c}$, and $R^{3c}$ are each preferably a hydrogen atom.

Meanwhile, specifically, the divalent hydrocarbon group having 2 to 4 carbon atoms as represented by $R^{5c}$ is a divalent alkylene group, such as a methylene group, an ethylene group, a propylene group of every kind, a butylene group of every kind, etc.

In the general formula (C-1), v represents a repeating number of $R^{5c}O$, and is a number ranging from 1 to 50, preferably from 1 to 20, more preferably from 1 to 10, and especially preferably from 1 to 5 in terms of an average value thereof. In the case where plural $R^{5c}Os$ are present, the plural $R^{5c}Os$ may be the same as or different from each other. v may be the same as or different from each other in every constituent unit.

w represents a number of 1 to 50, preferably 1 to 10, more preferably 1 to 2, and especially preferably 1; u represents a number of 0 to 50, preferably 2 to 25, and more preferably 5 to 15; and in the case where a plurality of each of w and u are present, they may be either block or random.

Furthermore, in the general formula (C-1), $R^{6c}$ preferably represents an alkyl group having 1 to 10 carbon atoms, an acyl group having 2 to 10 carbon atoms, or an oxygen-containing hydrocarbon group having 2 to 50 carbon atoms.

Specifically, this alkyl group having 1 to 10 carbon atoms represents a methyl group, an ethyl group, an n-propyl group, an isopropyl group, an n-butyl group, an isobutyl group, a sec-butyl group, a tert-butyl group, a pentyl group of every kind, a hexyl group of every kind, a heptyl group of every kind, an octyl group of every kind, a nonyl group of every kind, a decyl group of every kind, a cyclopentyl group, a cyclohexyl group, a methylcyclohexyl group of every kind, an ethylcyclohexyl group of every kind, a propylcyclohexyl group of every kind, a dimethylcyclohexyl group of every kind, or the like.

Examples of the acyl group having 2 to 10 carbon atoms include an acetyl group, a propionyl group, a butyryl group, an isobutyryl group, a valeryl group, an isovaleryl group, a pivaloyl group, a benzoyl group, a toluoyl group, and the like.

Furthermore, a methoxymethyl group, a methoxyethyl group, a methoxypropyl group, a 1,1-bismethoxypropyl group, a 1,2-bismethoxypropyl group, an ethoxypropyl group, a (2-methoxyethoxy)propyl group, a (1-methyl-2-methoxy)propyl group, and the like are preferably exemplified as specific examples of the oxygen-containing hydrocarbon group having 2 to 50 carbon atoms.

In the general formula (C-1), specifically, the hydrocarbon group having 1 to 10 carbon atoms as represented by $R^{4c}$ represents an alkyl group, such as a methyl group, an ethyl group, an n-propyl group, an isopropyl group, an n-butyl group, an isobutyl group, a pentyl group of every kind, a hexyl group of every kind, a heptyl group of every kind, an octyl group of every kind, a nonyl group of every kind, a decyl group of every kind, etc.; a cycloalkyl group, such as a cyclopentyl group, a cyclohexyl group, a methylcyclohexyl group of every kind, an ethylcyclohexyl group of every kind, a propylcyclohexyl group of every kind, a dimethylcyclohexyl group of every kind, etc.; an aryl group, such as a phenyl group, a methylphenyl group of every kind, an ethylphenyl group of every kind, a dimethylphenyl group of every kind, a propylphenyl group of every kind, a trimethylphenyl group of every kind, a butylphenyl group of every kind, a naphthyl group of every kind, etc.; an arylalkyl group, such as a benzyl group, a phenylethyl group of every kind, a methylbenzyl group of every kind, a phenylpropyl group of every kind, a phenylbutyl group of every kind, etc.; or the like.

The polyvinyl ether copolymer I having the constituent unit represented by the general formula (C-1) is able to improve lubricating properties, insulating properties, hygroscopicity, and so on while satisfying the compatibility through formation of the copolymer.

Meanwhile, in the polyvinyl ether copolymer II represented by the general formula (C-2), $R^{1c}$ to $R^{5c}$ and v are the same as those mentioned above. In the case where a plurality of each of $R^{4c}$ and $R^{5c}$ are present, they may be each the same as or different from each other. x and y each represent a number of 1 to 50, and in the case where a plurality of each of x and y are present, they may be either block or random. $X^c$ and $Y^c$ each independently represent a hydrogen atom, a hydroxyl group, or a hydrocarbon group having 1 to 20 carbon atoms.

It is preferred that the repeating numbers u, w, x, and y in the general formulae (C-1) and (C-2) are properly chosen such that a desired viscosity as mentioned later is obtained. A production method of each of the polyvinyl ether copolymers I and II is not particularly limited so long as it is a method for which each of the polyvinyl ether copolymers I and II is obtained.

The vinyl ethereal copolymers I or II represented by the general formula (C-1) or (C-2) can be formed into a polyvinyl ether copolymer having a structure in which one end thereof is represented by the following general formula (C-3) or (C-4), and the remaining end is represented by the following general formula (C-5) or (C-6).

(C-3)

(C-4)

In the aforementioned (C-3) and (C-4), $R^{1c}$ to $R^{6c}$ and v are the same as those as mentioned above.

(C-5)

(C-6)

In the aforementioned (C-5) and (C-6), $R^{1c}$ to $R^{6c}$ and v are the same as those as mentioned above.

<Polyol Ester Compound>

In the lubricating oil composition for a refrigerator, as the polyol ester compound that can be used as the base oil, an ester of a diol or a polyol having 3 to 20 hydroxyl groups and a fatty acid having about 1 to 24 carbon atoms is preferably used. Here, examples of the diol include ethylene glycol, 1,3-propanediol, propylene glycol, 1,4-butanediol, 1,2-butanediol, 2-methyl-1,3-propanediol, 1,5-pentanediol, neopentyl glycol, 1,6-hexanediol, 2-ethyl-2-methyl-1,3-propanediol, 1,7-heptanediol, 2-methyl-2-propyl-1,3-propanediol, 2,2-diethyl-1,3-propanediol, 1,8-octanediol, 1,9-nonanediol, 1,10-decanediol, 1,11-undecanediol, 1,12-dodecanediol, and the like. Examples of the polyol include a polyhydric alcohol, such as trimethylolethane, trimethylolpropane, trimethylolbutane, ditrimethylolpropane, tritrimethylolpropane, pentaerythritol, dipentaerythritol, tripentaerythritol, glycerin, a polyglycerin (e.g., dimer to icosamer of glycerin), 1,3,5-pentanetriol, sorbitol, sorbitan, a sorbitol glycerin condensate, adonitol, arabitol, xylitol, mannitol, etc.; a saccharide, such as xylose, arabinose, ribose, rhamnose, glucose, fructose, galactose, mannose, sorbose, cellobiose, maltose, isomaltose, trehalose, sucrose, raffinose, gentianose, merenditose, etc.; a partially etherified product thereof; a methyl glucoside (a glucoside); and the like. Above all, hindered alcohols, such as neopentyl glycol, trimethylolethane, trimethylolpropane, trimethylolbutane, ditrimethylolpropane, tritrimethylolpropane, pentaerythritol, dipentaerythritol, tripentaerythritol, etc., are preferred as the polyol.

As for the fatty acid, though the number of carbon atoms is not particularly limited, those having 1 to 24 carbon atoms are typically used. Among the fatty acids having 1 to 24 carbon atoms, those having 3 or more carbon atoms are preferred, those having 4 or more carbon atoms are more preferred, and those having 5 or more carbon atoms are still more preferred from standpoint of lubricating properties. Those having 18 or less carbon atoms are preferred, those having 12 or less carbon atoms are more preferred, and those having 9 or less carbon atoms are still more preferred from the standpoint of compatibility with the refrigerant.

The fatty acid may be any of a straight-chain fatty acid and a branched fatty acid, a straight-chain fatty acid is preferred from the standpoint of lubricating properties, and a branched fatty acid is preferred from the standpoint of hydrolysis stability. Furthermore, the fatty acid may be any of a saturated fatty acid and an unsaturated fatty acid.

Examples of the fatty acid include a straight-chain or branched fatty acid, such as isobutyric acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, oleic acid, etc.; a so-called neo acid in which an α-carbon atom is quaternary; and the like. More specifically, isobutyric acid, valeric acid (n-pentanoic acid), caproic acid (n-hexanoic acid), enanthic acid (n-heptanoic acid), caprylic acid (n-octanoic acid), pelargonic acid (n-nonanoic acid), capric acid (n-decanoic acid), oleic acid (cis-9-octadecenoic acid), isopentanoic acid (3-methylbutanoic acid), 2-methylhexanoic acid, 2-ethylpentanoic acid, 2-ethylhexanoic acid, 3,5,5-trimethylhexanoic acid, and the like are preferred.

The polyol ester may be a partial ester in which some of the hydroxyl groups of a polyol remain without being esterified, may be a complete ester in which all of the hydroxyl groups of the polyol are esterified, or may be a mixture of the partial ester and the complete ester, but the polyol ester is preferably the complete ester.

Among the polyol esters, due to the excellent hydrolysis stability, esters of a hindered alcohol, such as neopentyl glycol, trimethylolethane, trimethylolpropane, trimethylolbutane, ditrimethylolpropane, tritrimethylolpropane, pentaerythritol, dipentaerythritol, and tripentaerythritol, are preferred, and esters of neopentyl glycol, trimethylolethane, trimethylolpropane, trimethylolbutane, and pentaerythritol are more preferred.

Specific examples of the preferred polyol ester include a diester of neopentyl glycol and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolethane and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolpropane and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; a triester of trimethylolbutane and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid; and a tetraester of pentaerythritol and one or more fatty acids selected from isobutyric acid, valeric acid, caproic acid, enanthic acid, caprylic acid, pelargonic acid, capric acid, oleic acid, isopentanoic acid, 2-methylhexanoic acid, 2-ethylpentanoic acid, 2-ethylhexanoic acid, and 3,5,5-trimethylhexanoic acid.

The ester of two or more fatty acids may be a mixture of two or more esters of one fatty acid and a polyol, and an ester of a mixed fatty acid of two or more kinds thereof and a polyol. Particularly an ester of a mixed fatty acid and a polyol is excellent in low-temperature properties and compatibility with the refrigerant.

The base oil used in the present embodiment may be one containing as a major component at least one oxygen-containing organic compound selected from PVE, PAG, ECP, and POE. The term "containing as a major component" herein means that the oxygen-containing organic compound is contained in the base oil in a proportion of 50 mass % or more. The preferred content of the oxygen-containing organic compound in the base oil is 70 mass % or more, the more preferred content thereof is 90 mass % or more, and the further preferred content thereof is 100 mass %.

The base oil preferably has a kinetic viscosity at 100° C. of 1 to 50 mm$^2$/s, more preferably 3 to 40 mm$^2$/s, and further preferably 4 to 30 mm$^2$/s. When the kinetic viscosity at 100° C. is in a range of 1 to 50 mm$^2$/s, good lubricating performance may be exhibited.

[Other Additives]

The lubricating oil composition for a refrigerator according to the present embodiment preferably further contains one kind or two or more kinds selected from an antioxidant, an acid scavenger, an extreme pressure agent, and a antifoaming agent.

Examples of the antioxidant include a phenolic antioxidant, such as 2,6-di-tert-butyl-4-methylphenol, 2,6-di-tert-butyl-4-ethylphenol, 2,2'-methylenebis(4-methyl-6-tert-butylphenol), etc.; and an amine type antioxidant, such as phenyl-α-naphthylamine, N,N'-di-phenyl-p-phenylenediamine, etc., and a phenolic antioxidant is preferred. From the standpoints of effects and economy, and so on, the content of the antioxidant is typically 0.01 to 5 mass %, and preferably 0.05 to 3 mass %, based on the total amount of the lubricating oil composition for a refrigerator. In the present embodiment, by containing the antioxidant, the thermal stability of the lubricating oil composition for a refrigerator can be further improved.

Examples of the acid scavenger may include an epoxy compound, such as phenyl glycidyl ether, an alkyl glycidyl ether, an alkylene glycol glycidyl ether, a glycidyl ester, cyclohexene oxide, an α-olefin oxide, an epoxidized soybean oil, etc. Above all, from the standpoint of compatibility, phenyl glycidyl ether, an alkyl glycidyl ether, an alkylene glycol glycidyl ether, cyclohexene oxide, and an α-olefin oxide are preferred.

The alkyl group in the alkyl glycidyl ether and the alkylene group in the alkylene glycol glycidyl ether may be each branched, and the number of carbon atoms thereof is typically 3 to 30, preferably 4 to 24, and especially preferably 6 to 16. As for the α-olefin oxide, one having a total number of carbon atoms of generally 4 to 50, preferably 4 to 24, and especially 6 to 16 is used. In the present embodiment, the acid scavenger may be used solely, or may be used in combination of two or more thereof. The content thereof is typically 0.005 to 5 mass %, and preferably 0.05 to 3 mass % relative to the whole amount of the lubricating oil composition for a refrigerator from the standpoints of effects and inhibition of sludge generation.

In the present embodiment, by containing the acid scavenger, the thermal stability of the lubricating oil composition for a refrigerator can be further improved.

Examples of the extreme pressure agent may include a phosphorus type extreme pressure agent, such as a phosphate ester, an acidic phosphate ester, a phosphite ester, an acidic phosphite ester, and an amine salt thereof, etc.

From the standpoints of extreme pressure properties, friction properties, and so on, examples of the phosphorus type extreme pressure agent include tricresyl phosphate, trithiophenyl phosphate, tri(nonylphenyl) phosphite, dioleyl hydrogenphosphite, 2-ethylhexyldiphenyl phosphite, and the like.

In addition, examples of the extreme pressure agent include a metal salt of a carboxylic acid. The metal salt of a carboxylic acid as referred to herein is preferably a metal salt of a carboxylic acid having 3 to 60 carbon atoms, and more preferably a metal salt of a fatty acid having 3 to 30 carbon atoms, and especially preferably 12 to 30 carbon atoms. In addition, examples thereof may include a metal salt of a dimer acid or a trimer acid of the aforementioned fatty acid, and a dicarboxylic acid having 3 to 30 carbon atoms. Of those, a metal salt of a fatty acid having 12 to 30 carbon atoms and a dicarboxylic acid having 3 to 30 carbon atoms is especially preferred.

Meanwhile, the metal constituting the metal salt is preferably an alkali metal or an alkaline earth metal, and in particular, an alkali metal is optimum.

In addition, examples of the extreme pressure agent other than those as mentioned above may include a sulfur-based extreme pressure agent, such as sulfurized fats and oils, a sulfurized fatty acid, a sulfurized ester, a sulfurized olefin, a dihydrocarbyl polysulfide, a thiocarbamate compound, a thioterpene compound, a dialkyl thiodipropionate compound, etc.

The content of the extreme pressure agent is typically 0.01 to 5 mass %, and especially preferably 0.05 to 3 mass %, on the basis of the whole amount of the lubricating oil composition for a refrigerator from the standpoints of lubricating properties and stability.

The extreme pressure agent may be used solely, or be used in combination of two or more thereof.

Examples of the anti-foaming agent may include a silicone oil, a fluorinated silicone oil, and the like. The content of the defoaming agent is typically 0.005 to 2 mass %, and preferably 0.01 to 1 mass %, relative to the whole amount of the lubricating oil composition for a refrigerator.

The lubricating oil composition for a refrigerator may further contain other additives than the additives enumerated above. Examples of the additives include an oiliness agent, a copper deactivator, a rust preventive, an oxygen scavenger, and the like.

Examples of the oiliness agent include an aliphatic saturated or unsaturated monocarboxylic acid, such as stearic acid, oleic acid, etc.; a polymerized fatty acid, such as a dimer acid, a hydrogenated dimer acid, etc.; a hydroxy fatty acid, such as ricinoleic acid, 12-hydroxystearic acid, etc.; an aliphatic saturated or unsaturated monoalcohol, such as lauryl alcohol, oleyl alcohol, etc.; an aliphatic saturated or unsaturated monoamine, such as stearylamine, oleylamine, etc.; an aliphatic saturated or unsaturated monocarboxylic acid amide, such as lauric acid amide, oleic acid amide, etc.; a partial ester of a polyhydric alcohol, such as glycerin, sorbitol, etc., and an aliphatic saturated or unsaturated monocarboxylic acid; and the like. Such an oiliness agent may be used solely, or may be used in combination of two or more thereof.

Examples of the copper deactivator may include an N—[N,N'-dialkyl(alkyl group having 3 to 12 carbon atoms) aminomethyl]triazole, and the like.

Examples of the rust preventive may include a metal sulfonate, an aliphatic amine compound, an organic phosphite ester, an organic phosphate ester, an organic sulfonic acid metal salt, an organic phosphoric acid metal salt, an alkenyl succinate ester, a polyhydric alcohol ester, and the like.

Examples of the oxygen scavenger that may be used in combination with the aforementioned cyclic organic compound include an α-olefin, α-farnesene, and β-farnesene.

The lubricating oil composition for a refrigerator according to the present embodiment may further contain various other known additives within the range where the object of the present invention is not impaired.

The additives other than the cyclic organic compound contained in the lubricating oil composition for a refrigerator is preferably contained in an amount of 20 mass % or less, and preferably about 0 to 10 mass %, based on the total amount of the lubricating oil composition for a refrigerator.

[Production Method of Lubricating Oil Composition for Refrigerator]

The lubricating oil composition for a refrigerator according to the present embodiment can be produced by blending the cyclic organic compound with a base oil. In the production method, other additives may be further blended with the base oil. The details of the base oil, the cyclic organic compound, and the additives are as described in the foregoing, and the descriptions thereof are omitted herein. The cyclic organic compound and the additives are not particularly limited in the blending method, the blending order, and the like, as long as they are blended in the base oil.

[Refrigerant]

The lubricating oil composition for a refrigerator according to the present embodiment is used in combination with a refrigerant in a refrigerator. For the lubricating oil composition for a refrigerator, the amounts of the refrigerant and the lubricating oil composition for a refrigerator used are generally 99/1 to 10/90 in terms of mass ratio of refrigerant/lubricating oil composition for a refrigerator, and are preferably in a range of 95/5 to 30/70. When the mass ratio is in the range, the refrigerating performance and the lubricating performance in the refrigerator can be properly obtained.

The refrigerant that is used in combination with the lubricating oil composition for a refrigerator contains at least one fluorine-containing organic compound selected from compounds represented by the following molecular formula (A):

$$C_p F_r R_s \qquad (A)$$

wherein R represents Cl, Br, I, or H; p represents an integer of from 2 to 6; r represents an integer of from 1 to 12; and s represents an integer of from 0 to 11, provided that the molecule contains at least one carbon-carbon unsaturated bond.

The molecular formula (A) shows the kinds and the numbers of the elements in the molecule, and the formula (A) represents a fluorine-containing organic compound having a number of carbon atoms C of from 2 to 6. With having a number of carbon atoms of from 2 to 6, the fluorine-containing organic compound can have physical and chemical properties, such as a boiling point, a freezing point and an evaporation latent heat, that are required for a refrigerant.

In the molecular formula (A), the bond types of the p carbon atoms represented by $C_p$ include a carbon-carbon single bond and an unsaturated bond, such as a carbon-carbon double bond. The carbon-carbon unsaturated bond is preferably a carbon-carbon double bond from the standpoint of the stability, and the fluorine-containing organic compound preferably has 1 or more unsaturated bond such as a carbon-carbon double bond in the molecule thereof, with the number thereof being preferably 1. Namely, at least one of the bond types of the p carbon atoms represented by $C_p$ is preferably a carbon-carbon double bond.

In the molecular formula (A), R represents Cl, Br, I, or H, and may be any one of them, and in the case where two or more of R's are present, the atoms represented by R may be the same as or different from each other. For reducing the ozone layer destruction, it is preferred that the atoms represented by R include H, and it is more preferred that all of the atoms represented by R are H.

Preferred examples of the fluorine-containing organic compound represented by the molecular formula (A) include an unsaturated fluorinated hydrocarbon compound. The compound will be described in detail below.

<Unsaturated Fluorinated Hydrocarbon Compound>

Examples of the unsaturated fluorinated hydrocarbon compound to be used as a refrigerant in a refrigerator include an unsaturated fluorinated hydrocarbon compound represented by the molecular formula (A), in which all of the atoms represented by R are H, p is from 2 to 6, r is from 1 to 12, and s is from 1 to 11.

Specific examples of the unsaturated fluorinated hydrocarbon compound include a fluorinated compound of a linear or branched chain olefin having a number of carbon atoms of from 2 to 6 and a fluorinated compound of a cyclic olefin having a number of carbon atoms of from 4 to 6 and having a carbon-carbon double bond.

Specific examples thereof include ethylene having from 1 to 3 fluorine atoms introduced therein, propene having from 1 to 5 fluorine atoms introduced therein, butene having from 1 to 7 fluorine atoms introduced therein, pentene having from 1 to 9 fluorine atoms introduced therein, hexene having from 1 to 11 fluorine atoms introduced therein, cyclobutene having from 1 to 5 fluorine atoms introduced therein, cyclopentene having from 1 to 7 fluorine atoms introduced therein, and cyclohexene having from 1 to 9 fluorine atoms introduced therein.

Specific examples of the preferred unsaturated fluorinated hydrocarbon compound include 1,2,3,3,3-pentafluoropropene (HFO1225ye), 1,3,3,3-tetrafluoropropene (HFO1234ze), 2,3,3,3-tetrafluoropropene (HFO1234yf), 1,2,3,3-tetrafluoropropene (HFO1234ye), 3,3,3-trifluoropropene (HFO1243zf), and trifluoroethylene (HFO1123), and among these, HFO1234ze, HFO1234yf, and HFO1234ye are more preferred.

The unsaturated fluorinated hydrocarbon compound may be used solely or as a combination of two or more kinds thereof, and may be used in combination with a refrigerant other than the unsaturated fluorinated hydrocarbon compound. In particular, a refrigerant containing HFO1234ze solely or a refrigerant containing HFO1234yf solely is preferred.

The refrigerant in the present embodiment may contain the aforementioned fluorine-containing organic compound solely, and may contain a refrigerant other than the fluorine-containing organic compound. The fluorine-containing organic compound suffices to be a major component in the refrigerant, and the amount thereof is preferably 50 mass % or more, more preferably from 70 to 100 mass %, and further preferably from 90 to 100 mass %, based on the whole refrigerant.

In the present embodiment, the effect of the cyclic organic compound can be further effectively exhibited in the case where the refrigerant contains a larger amount of the aforementioned fluorine-containing organic compound having an unsaturated bond.

In the present embodiment, examples of the refrigerant other than the fluorine-containing organic compound include one kind or two or more kinds selected from a fluorinated hydrocarbon refrigerant other than the fluorine-containing organic compound, such as a saturated fluorinated hydrocarbon compound (HFC), and a natural refrigerant.

<Saturated Fluorinated Hydrocarbon Compound>

The saturated fluorinated hydrocarbon compound is generally a fluorinated compound of an alkane having from 1 to 4 carbon atoms, preferably a fluorinated compound of an alkane having from 1 to 3 carbon atoms, and more preferably a fluorinated compound of an alkane having from 1 to 2 carbon atoms (i.e., methane or ethane). Specific examples of the fluorinated compound of methane or ethane include trifluoromethane (R23), difluoromethane (R32), 1,1-difluoroethane (R152a), 1,1,1-trifluoroethane (R143a), 1,1,2-trifluoroethane (R143), 1,1,1,2-tetrafluoroethane (R134a), 1,1,2,2-tetrafluoroethane (R134) and 1,1,1,2,2-pentafluoroethane (R125). The saturated fluorinated hydrocarbon compound may also be a compound obtained by halogenating the aforementioned fluorinated compound of an alkane with a halogen atom other than fluorine, and examples thereof include trifluoroiodomethane ($CF_3I$).

The saturated fluorinated hydrocarbon compound may be used solely, or it may be used in combination of two or more thereof. Examples of the case where two or more thereof are used in combination include a mixed refrigerant containing two or more kinds of saturated fluorinated hydrocarbon compounds each having from 1 to 3 carbon atoms, and a mixed refrigerant containing two or more kinds of saturated fluorinated hydrocarbon compounds each having from 1 or 2 carbon atoms. In particular, a refrigerant containing difluoromethane (R32) solely is preferred.

<Natural Refrigerant>

Examples of the natural refrigerant include carbon dioxide (carbon dioxide gas), a hydrocarbon, such as propane, n-butane, isobutane, 2-methylbutane, n-pentane, cyclopentane, isobutane, and n-butane, and ammonia, and these compounds may be may be used solely, or it may be used in combination of two or more thereof. Both the saturated fluorinated hydrocarbon compound and the natural refrigerant may be used in combination.

[Composition for Refrigerator]

A composition for a refrigerator of the present invention contains the aforementioned refrigerant and the aforementioned lubricating oil composition for a refrigerant of the present invention. In the composition for a refrigerator according to one embodiment of the present invention, the amounts of the refrigerant and the lubricating oil composition for a refrigerator used are preferably from 99/1 to 10/90, and more preferably from 95/5 to 30/70, in terms of mass ratio of refrigerant/lubricating oil composition for a refrigerator.

[Refrigerator]

The refrigerator according to the present embodiment contains, charged therein, the aforementioned lubricating oil composition for a refrigerator and the refrigerant. The refrigerator as referred to herein has a refrigeration cycle constituted of essential components including a compressor, a condenser, an expansion mechanism (e.g., an expansion valve, etc.), and an evaporator, or including a compressor, a condenser, an expansion mechanism, a dryer, and an evaporator. The lubricating oil composition for a refrigerator is one to be used for lubricating a sliding portion provided in, for example, a compressor, etc.

More specifically, the aforementioned refrigerator can be used for, for example, various refrigerator systems, hot water systems, and heating systems, such as various car air conditioners, e.g., an open type car air-conditioner and an electric car air-conditioner, a gas heat pump (GHP), an air conditioner, a fridge, an automatic vending machine, a showcase, a hot water supply machine, a floor heater, etc., and among these, is preferably used for a car air-conditioner.

EXAMPLE

The present invention will be described more specifically with reference to examples below, but the present invention is not limited to the examples.

The properties and the evaluation of the lubricating oil compositions for a refrigerator were obtained by the procedures shown below.

(1) Kinetic Viscosity (100° C.)

The kinematic viscosity was measured with a glass capillary viscometer according to JIS K2283 at the temperature.

(2) Thermal Stability Test

A combination of the lubricating oil composition for a refrigerator and the refrigerant (30 g/30 g, water content in oil: 500 ppm) and a metal catalyst formed of iron, copper, and aluminum were charged in a test tube having an internal capacity of 200 mL, in which 25 mL of air (capacity under the atmospheric pressure) was charged, followed by sealing, and then subjected to thermal deterioration by retaining in an autoclave under a condition of a temperature of 175° C. for 336 hours, and then the acid value after the thermal deterioration was measured. The acid value was measured by the indicator method according to "Lubricating oil neutralization test method" defined in JIS K2501. The refrigerant used was 2,3,3,3-tetrafluoropropene (HFO1234yf).

<Sludge Determination>

After the aforementioned thermal deterioration, the test tube was taken out, and the area of sludge accumulated on the bottom of the test tube was calculated and determined for the sludge amount by the following determination standard.

A: no sludge found
B: less than 0.01 cm$^2$ of sludge found
C: 0.01 cm$^2$ or more and less than 0.25 cm$^2$ of sludge found
D: 0.25 cm$^2$ or more of sludge found Examples 1 to 19 and Comparative Examples 1 to 7

The additives were blended with the base oils as shown in Table 1 to prepare lubricating oil compositions for a refrigerator of Examples 1 to 19 and Comparative Examples 1 to 7, and the lubricating oil compositions for a refrigerator were subjected to the thermal stability test. The results are shown in Table 1.

TABLE 1

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Base oil (mass %) | PVE | 97.3 | 97.3 | 97.3 | 97.3 | 98.0 | 97.8 | 97.3 | 96.8 | 97.3 | 97.3 | 97.3 | — | — |
| | PAG | — | — | — | — | — | — | — | — | — | — | — | 97.3 | 97.3 |
| | ECP | — | — | — | — | — | — | — | — | — | — | — | — | — |
| | POE | — | — | — | — | — | — | — | — | — | — | — | — | — |
| Additive (mass %) | Cyclic organic compound 1 | 1.0 | — | — | — | — | — | — | — | — | — | — | 1.0 | — |
| | Cyclic organic compound 2 | — | 1.0 | — | — | — | — | — | — | — | — | — | — | — |
| | Cyclic organic compound 3 | — | — | 1.0 | — | — | — | — | — | — | — | — | — | — |
| | Cyclic organic compound 4 | — | — | — | 1.0 | — | — | — | — | — | — | — | — | 1.0 |
| | Cyclic organic compound 5 | — | — | — | — | 0.3 | 0.5 | 1.0 | 1.5 | — | — | — | — | — |
| | Cyclic organic compound 6 | — | — | — | — | — | — | — | — | — | 1.0 | — | — | — |
| | Cyclic organic compound 7 | — | — | — | — | — | — | — | — | — | — | 1.0 | — | — |
| | Cyclic organic compound 8 | — | — | — | — | — | — | — | — | — | — | — | 1.0 | — |
| | Cyclic organic compound 9 | — | — | — | — | — | — | — | — | — | — | — | — | — |
| | Cyclic organic compound 10 | — | — | — | — | — | — | — | — | — | — | — | — | — |

TABLE 1-continued

| | | | | | | | | | | | | | | |
|---|---|---|---|---|---|---|---|---|---|---|---|---|---|---|
| Thermal stability test | Acid value mgKOH/g | 0.10 | 0.15 | 0.16 | 0.09 | 0.09 | 0.05 | 0.01 | 0.01 | 0.02 | 0.02 | 0.01 | 0.13 | 0.09 |
| | Sludge determination | B | B | B | A | A | A | A | A | A | A | A | B | A |

| | | Example | | | | | | Comparative Example | | | | | | |
|---|---|---|---|---|---|---|---|---|---|---|---|---|---|---|
| | | 14 | 15 | 16 | 17 | 18 | 19 | 1 | 2 | 3 | 4 | 5 | 6 | 7 |
| Base oil (mass %) | PVE | — | — | — | — | — | — | 97.3 | 97.3 | — | — | — | — | 98.3 |
| | PAG | 97.3 | 97.3 | 97.3 | 97.3 | — | — | — | — | 97.3 | 97.3 | — | — | — |
| | ECP | — | — | — | — | 97.3 | — | — | — | — | — | 97.3 | — | — |
| | POE | — | — | — | — | — | 97.3 | — | — | — | — | — | 97.3 | — |
| Additive (mass %) | Cyclic organic compound 1 | — | — | — | — | — | — | — | — | — | — | — | — | — |
| | Cyclic organic compound 2 | — | — | — | — | — | — | — | — | — | — | — | — | — |
| | Cyclic organic compound 3 | — | — | — | — | — | — | — | — | — | — | — | — | — |
| | Cyclic organic compound 4 | — | — | — | — | — | — | — | — | — | — | — | — | — |
| | Cyclic organic compound 5 | 1.0 | — | — | — | 1.0 | 1.0 | — | — | — | — | — | — | — |
| | Cyclic organic compound 6 | — | 1.0 | — | — | — | — | — | — | — | — | — | — | — |
| | Cyclic organic compound 7 | — | — | 1.0 | — | — | — | — | — | — | — | — | — | — |
| | Cyclic organic compound 8 | — | — | — | 1.0 | — | — | — | — | — | — | — | — | — |
| | Cyclic organic compound 9 | — | — | — | — | — | — | 1.0 | — | 1.0 | — | 1.0 | 1.0 | — |
| | Cyclic organic compound 10 | — | — | — | — | — | — | — | 1.0 | — | 1.0 | — | — | — |
| Thermal stability test | Acid value mgKOH/g | 0.01 | 0.03 | 0.01 | 0.01 | 0.02 | 0.04 | 0.53 | 0.50 | 0.42 | 0.55 | 0.55 | 0.51 | 0.88 |
| | Sludge determination | A | A | A | A | A | A | C | D | C | D | C | D | D |

The components in Table 1 are as follows.
(Base Oil)
<PVE>
Polyethyl vinyl ether-polyisobutyl vinyl ether copolymer (mass ratio: 9/1, kinetic viscosity at 100° C.: 7.91 mm$^2$/s)
<PAG>
Polyoxypropylene glycol (both ends: methyl group, kinetic viscosity at 100° C.: 9.52 mm$^2$/s)
<ECP>
Polypropylene glycol-polyethyl vinyl ether copolymer (mass ratio: 5/1, kinetic viscosity at 100° C.: 9.17 mm$^2$/s)
<POE>
Ester of pentaerythritol and a mixture of isobutyric acid and 3,5,5-trimethylhexanoic acid (molar ratio of isobutyric acid/3,5,5-trimethylhexanoic acid: 4/6, kinetic viscosity at 100° C.: 7.98 mm$^2$/s)
(Additive)
 Cyclic organic compound 1: cyclohexene
 Cyclic organic compound 2: 1-methylcyclohexene
 Cyclic organic compound 3: vinylcyclohexane
 Cyclic organic compound 4: 4-vinylcyclohexene
 Cyclic organic compound 5: β-pinene
 Cyclic organic compound 6: α-pinene
 Cyclic organic compound 7: limonene
 Cyclic organic compound 8: γ-terpinene
 Cyclic organic compound 9: benzene
 Cyclic organic compound 10: cyclohexane
(Other Additives)
In Examples and Comparative Examples in Table 1, the following additives were added as the other additives in amounts in terms of mass % shown below based on the whole amount of the lubricating oil composition for a refrigerator.

Antioxidant (2,6-di-tert-butyl-4-methylphenol): 0.3 mass %
 Extreme pressure agent (tricresyl phosphate): 1.0 mass %
 Acid scavenger (2-ethylhexyl glycidyl ether): 0.3 mass %
 Anti-foaming agent (silicone oil defoaming agent): 0.1 mass %

In Examples, the lubricating oil composition for a refrigerator contained the cyclic organic compound having a cyclic structure and having one or more non-conjugated double bond in a cyclic structure or a side chain thereof, and thus the thermal stability was improved, and the formation of sludge was sufficiently suppressed. In Comparative Examples, on the other hand, the cyclic organic compound contained in the lubricating oil composition for a refrigerator did not have a non-conjugated double bond, and thus the thermal stability was not improved, and the formation of sludge was not sufficiently suppressed.

The invention claimed is:
1. A lubricating oil composition for a refrigerator, comprising:
 a base oil; and
 β-pinene;
 wherein the lubricating oil composition is used in combination with a refrigerant consisting of at least one selected from the group consisting of 1,3,3,3-tetrafluoropropene, 2,3,3,3-tetrafluoropropene, and 1,2,3,3-tetrafluoropropene.
2. The lubricating oil composition according to claim 1, wherein the β-pinene is present in an amount of 0.1 to 10 mass % based on a total amount of the lubricating oil composition.

3. The lubricating oil composition according to claim 1, further comprising at least one selected from the group consisting of cyclohexene, 1-methylcyclohexene, vinylcyclohexane, 4-vinylcyclohexene, limonene, α-pinene, and γ-terpinene.

4. The lubricating oil composition according to claim 1, further comprising at least one selected from the group consisting of limonene, α-pinene, and γ-terpinene.

5. The lubricating oil composition according to claim 1, wherein the base oil comprises at least one selected from the group consisting of a polyoxyalkylene glycol compound, a polyvinyl ether compound, a copolymer having a structure of a poly(oxy)alkylene glycol or a monoether thereof and a polyvinyl ether, and a polyol ester compound.

6. The lubricating oil composition according to claim 1, further comprising:
   at least one additive selected from the group consisting of an antioxidant, an acid scavenger, an extreme pressure agent, and an anti-foaming agent.

7. A method for producing a lubricating oil composition, the method comprising:
   blending β-pinene with a base oil,
   wherein the lubricating oil composition is used in combination with a refrigerant consisting of at least one selected from the group consisting of 1,3,3,3-tetrafluoropropene, 2,3,3,3-tetrafluoropropene, and 1,2,3,3-tetrafluoropropene.

8. The lubricating oil composition according to claim 1, wherein the refrigerant consists of 1,2,3,3-tetrafluoropropene.

9. The lubricating oil composition according to claim 1, wherein the base oil comprises at least one selected from the group consisting of a polyoxyalkylene glycol compound, a polyvinyl ether compound, and a copolymer having a structure of a poly(oxy)alkylene glycol or a monoether thereof and a polyvinyl ether.

10. A refrigerator, comprising:
    a refrigerant consisting of at least one selected from the group consisting of 1,3,3,3-tetrafluoropropene, 2,3,3,3-tetrafluoropropene, and 1,2,3,3-tetrafluoropropene; and
    a lubricating oil composition comprising a base oil and β-pinene.

11. A car air conditioner, a gas heat pump, an air conditioner, a fridge, an automatic vending machine, a showcase, a hot water supply machine, or a floor heater comprising the lubricating oil composition of claim 1.

* * * * *